United States Patent [19]

Atwell

[11] Patent Number: 5,422,936
[45] Date of Patent: Jun. 6, 1995

[54] ENHANCED MESSAGE SERVICE INDICATION

[75] Inventor: Douglas J. Atwell, Fairfax County, Va.

[73] Assignee: Bell Atlantic Network Services, Inc., Arlington, Va.

[21] Appl. No.: 936,455

[22] Filed: Aug. 28, 1992

[51] Int. Cl.$^6$ ............................................. H04M 3/54
[52] U.S. Cl. ........................................ 379/88; 379/67; 379/211; 379/375
[58] Field of Search ...................... 379/67, 88, 89, 201, 379/211, 212, 373, 375, 210, 372

[56] References Cited

U.S. PATENT DOCUMENTS

| | | |
|---|---|---|
| 4,652,700 | 3/1987 | Matthews et al. |
| 5,008,926 | 4/1992 | Misholi |
| 5,012,511 | 4/1991 | Hanle et al. |
| 5,023,868 | 6/1991 | Davidson et al. ............... 379/112 |
| 5,200,994 | 4/1993 | Sasano et al. ................. 379/375 |

Primary Examiner—James L. Dwyer
Assistant Examiner—Fan Tsang
Attorney, Agent, or Firm—Lowe, Price, LeBlanc & Becker

[57] ABSTRACT

The present invention provides improved communication systems and call processing methods wherein each subscriber to a multiple directory number per line (MDNL) type service and to a message storage and retrieval service individually selects how these two services will interact. Specifically, the subscriber has the option to set control data for selecting which directory number the switching system transmits at the time of forwarding calls to the system which provides the message service. If the subscriber selects a first option, the switching system transmits the directory number actually dialed to the message service system. If the subscriber selects a second option, the switching system transmits a predetermined one of the assigned directory numbers to the message service system. In one embodiment, the system also offers the subscriber a third option. If the subscriber selects the third option, the communication system will in some way prevent the storage of messages by the service system if the caller has dialed a preselected one of the assigned directory numbers.

42 Claims, 3 Drawing Sheets

ENHANCED MESSAGE SERVICE INDICATION

TECHNICAL FIELD

The present invention relates to communication systems, such as telephone networks, which provide both distinctive ringing for a plurality of directory numbers assigned to a single telephone line and provide forwarding of calls to a message service system, such as a voice mail system.

BACKGROUND ART

For a number of years, telephone companies have been providing a service which assigned two or more directory numbers per line and corresponding distinctive ringing signals. One of the telephone switch vendors refer to this feature as "Multiple Directory Numbers per Line" or "MDNL," and the local telephone companies have offered the service under a variety of names such as "IdentaRing TM". With such a service, the telephone central office switch connected to a called subscriber's line will apply a different ringing signal to the line depending on which of the assigned directory numbers the current caller dialed. For example, if a caller dialed the main number assigned to the subscriber, the local telephone office switch may apply a standard ringing signal (two seconds on, four seconds off) to the called subscriber's line. If the caller dialed the second number assigned to the subscriber's line, the local telephone office switch applies a different ringing signal to the line.

The various ringing signals produce different audible rings at the subscriber's premises. As a result, persons present at the subscriber's premises can tell which number the caller dialed before answering each incoming call. The ability to identify the dialed number allows the subscriber and persons at the subscriber's premises to give the numbers to different potential callers for a variety of different purposes.

For example, if a family subscribes to the service and the telephone company provides the service via the family's residential line, the main number might be used for the parents and/or for general family activities. The secondary number, however, could be given to a teenage member of the family. Calls producing an audible ring corresponding to the secondary number would indicate in advance that an incoming call was for the teenager. In such a case, the parents might choose not to answer the call. Similarly, if a subscriber operates a business out of the home, one of the numbers and corresponding ringing sounds might be used for incoming business calls.

Another telephone service which has recently become quite popular is voice mail. With a typical voice mail service, such as those offered through local telephone companies, a caller dials the subscriber's telephone number. If the subscriber's line identified by the subscriber's "mailbox" telephone number is busy or if there is no answer, the telephone network forwards the call to a voice mail system. This voice mail system provides an answering prompt message to the caller. In many systems, this prompt will include a personalized message recorded by the subscriber, for example the subscriber's name spoken in the subscriber's own voice. After the prompt, the voice mail system records a message from the caller in the called subscriber's mailbox.

Such voice mail systems typically service a large number of telephone service subscribers. The telephone system forwards data to the voice mail system identifying the telephone line or station called. The voice mail system uses this data to retrieve the called subscriber's personalized prompt and to store incoming messages in the correct subscriber's mailbox. Typically, the telephone system forwards the telephone number of the called line to the voice mail service. Problems have arisen, however, where the called subscriber also subscribes to a multiple directory number per line type service such as "IdentaRing TM".

In prior art systems, the type of telephone central office switch to which the called subscriber's line connected determined how the system would treat calls to subscriber's of both voice mail and a multiple directory number per line type service. If the switch was the product of one manufacturer, it might forward calls for the main number to the voice mail system but block forwarding of calls when the caller dialed one of the secondary numbers.

Switches from other vendors would always forward the call and transmit the actual number dialed to the voice mail system for identification purposes. If the subscriber subscribed to a different mailbox for each of the numbers, this would allow proper routing to the individual mailboxes. If the subscriber chose to subscribe to only a single mailbox, however, the voice mail system could not process incoming calls identified by numbers other than the main number, which typically corresponded to the single mailbox.

Conversely, other switches would forward calls but would only transmit the main number, corresponding to the line of the called subscriber. This number would be sufficient if the subscriber has only one mailbox. If the subscriber has multiple mailboxes, however, there was no effective way to route incoming calls to the different mailboxes. To approximate different mailboxes, the voice mail system could be programmed to offer the single mailbox in partitioned or subdivided form. To reach a subdivided section within the mailbox, a caller would have to listen to a general prompt message and select the proper sub-mailbox, e.g. for the family in general, for one or both of the parents, for the teenager, or for the business operated from the home. The requirement to select which sub-mailbox places an additional burden on callers and may discourage some callers from leaving a message. Also, delivery of only the main number could not be used to route messages to any particular subsection within the mailbox without the manual selection procedure.

From the above discussion it becomes clear that existing systems do not provide sufficient flexibility of operation for effective service to subscribers to both multiple directory number per line type services and message service systems, such as voice mail services.

DISCLOSURE OF THE INVENTION

Objectives

The objective of this invention is to improve interactions between multiple directory number per line type services and message service systems, such as voice mail systems.

Another objective is to allow a party who subscribes to both multiple directory number per line type services and voice mail services considerable flexibility in defining these two services and how these services interact. In this regard, the interaction of the two services should be capable of definition, at the subscriber's option, on a per line basis.

Another objective is to allow a subscriber to define the forwarding to the message service system from a line to which multiple directory numbers are assigned in such a manner that the subscriber can choose to have all such calls routed to a single mailbox or selectively routed to a plurality of mailboxes. When selectively routed to a plurality of mailboxes, the different mailboxes can be assigned to different persons or to different activities of the subscriber. Alternatively, when selectively routed to a plurality of mailboxes, the different mailboxes can store different types of messages (e.g. audible messages and data messages such as facsimile).

A more specific objective is to allow each subscriber to choose whether calls to that subscriber's line should be forwarded along with a single directory number (e.g. the main number) or should be forwarded along with the number actually dialed.

A further objective is to allow the subscriber to choose to have forwarded calls for a specified one or more of the multiple directory numbers assigned to the subscriber's line effectively disabled in some manner prior storing of any message in a mailbox of the message service system.

SUMMARY

To achieve the above objectives, the present invention provides communication systems and methods of call processing. Each subscriber to a multiple directory number per line type service and to a message service individually selects how these two services will interact. At each subscriber's option, control data is set on a per line basis for selecting which directory number(s) the switching system forwards to the message service system.

In a first aspect, the invention is a call processing method. The method operates on calls through a communication system including at least one switching system connected to a plurality of subscriber lines and connected to a message service system. The call processing method first determines if forwarding of a call directed to one of the subscriber lines is necessary. The method also determines if the one subscriber line has assigned to it a plurality of directory numbers. If the one subscriber line has assigned to it more than one directory number, the next step is to determine which of two options the subscriber associated with the one subscriber line has selected. One of these options is to have the directory number actually dialed forwarded to the message service system, and the other option is to always forward a predetermined one of the plurality of directory numbers assigned to the one subscriber line. The switching system will forward the call to the message service system, and transmit a number to the message service system based on the selected option. In a second aspect, the invention comprises the communication system itself comprising the components for performing essentially the steps of the call processing method.

In a preferred embodiment, the switching system is a telephone network, for example including at least one local telephone type central office switch. The subscriber lines in such a system are telephone lines. The message service system is a voice messaging type system for providing voice mail services. Such message service systems comprise means to store audible messages, although today many such systems also include means to store one or more types of data message, e.g. facsimile. If the method is implemented in such a telephone network providing a multiple directory number per line type service, the preselected directory number identified in the second option typically would be the primary or "main" directory telephone number assigned to the called subscriber's telephone line. The actual numbers dialed by the caller, transmitted under the first option, would be the individual directory numbers assigned to the called subscriber's telephone line.

In a further aspect, the invention provides call processing methods and corresponding communication systems which also provide the subscriber with three options. If the subscriber has selected either of the first or second options, the system will process calls as outlined above. The third option, however, allows the subscriber to disable certain calls prior to storage of a message in any of the mailboxes within the message service system. In one example using the third option, the switching system forwards the directory number actually dialed to the message service system unless the directory number actually dialed corresponds to a preselected one of the plurality of directory numbers assigned to the one subscriber line. The preselected number here identifies one of the assigned directory numbers for which the subscriber does not want incoming calls forwarded or messages stored in the message service system. If the subscriber has selected this third option, and the directory number actually dialed does not correspond to the preselected directory number, the switching system forwards the call to the message service system, and transmits the directory number actually dialed to the message service system. Alternatively, the system is set up to transmit the predetermined or "main" number, instead of the actual number dialed. If the dialed number actually corresponds to the preselected number, the system disables message storage in one of several ways discussed below.

The storage of messages by the message service system can be prevented in a number of different ways. In one procedure, the system blocks forwarding altogether. Thus calls using the directory number designated for disabling are terminated by the switching system, for example by connection to a busy tone, without forwarding of the calls to the message service system. In the preferred alternative, the call is forwarded to the message service system, but the transmission of data to the message service system does not include a telephone number. As a result, the message service system can not route messages to any particular mailbox. The message service system therefore provides an error message to the caller and disconnects the call.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
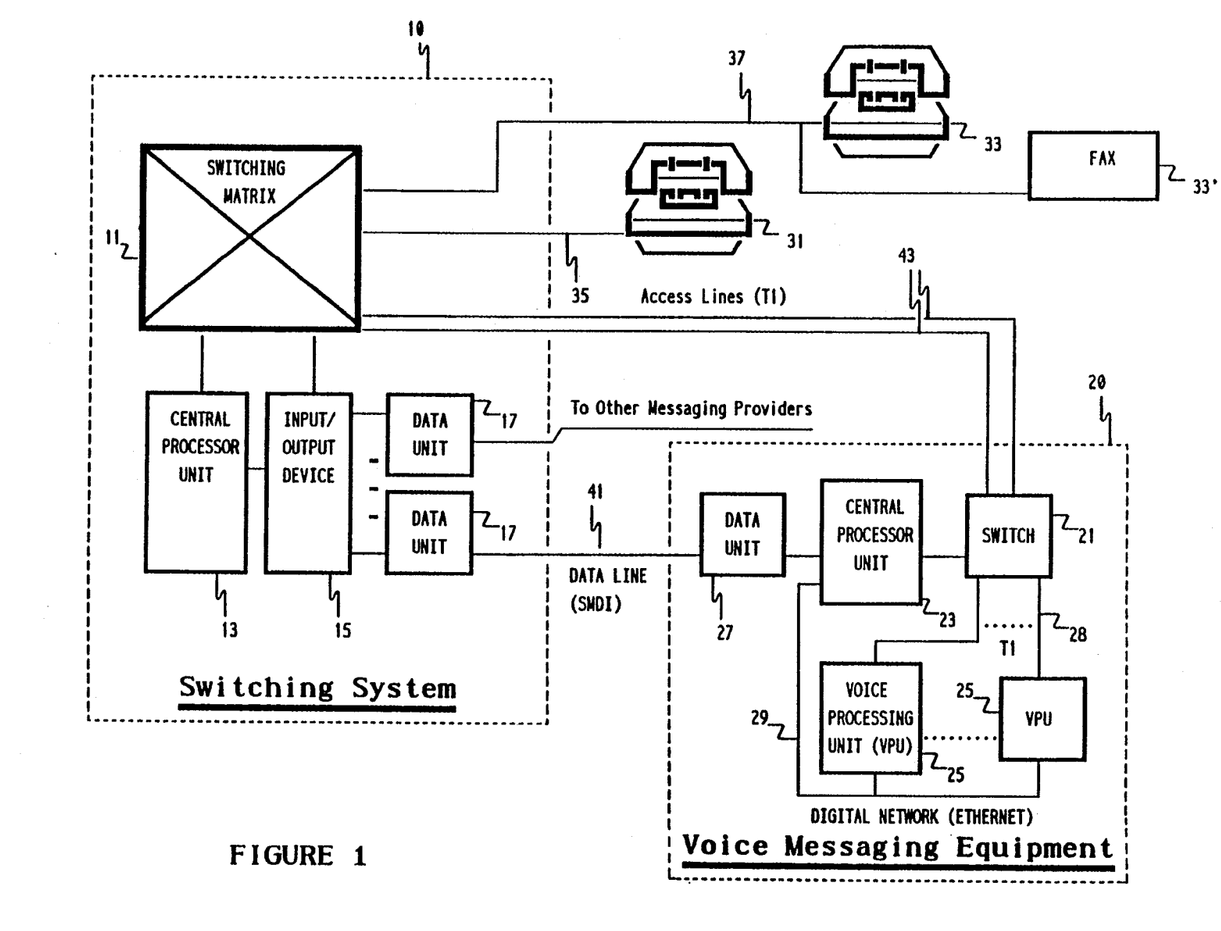
FIG. 1 is simplified block diagram of a communication system implementing the present invention.

In its simplest form, shown in FIG. 1, the communication system of the present invention includes at least one switching system 10 and at least one message service system, such as voice messaging equipment 20. The switching system 10 may be a local telephone central office switch. FIG. 1 illustrates only those elements of the central office switch which are significant for purposes of discussion of the present invention.

The switching system 10 includes a switching matrix 11, a central processing unit 13, an input/output device 15 and one or more data communication units 17. Structurally, the switching system 10 is a standard central office telephone switch. The software of the central processing unit, however, has been modified so that during call forwarding to a message service system the central processing unit 13 will selectively output different numbers for transmission to the message service system. The central processor software will determine which number to send based on stored data set at the called subscriber's option, on a per line basis, as will be discussed in detail with regard to FIGS. 2 and 3.

Each subscriber has at least one piece of customer premises equipment, illustrated as telephone station sets 31, 33 in the drawing. Local telephone lines 35, 37 serve as communication links between each of the telephone station sets 31, 33 and the switching system 10. Many subscribers will have additional equipment connected to their telephone lines, and in many cases the additional equipment will send or receive messages other than voice messages. A variety of data communication devices have become common. As an illustrative example, FIG. 1 shows a facsimile or "FAX" machine 33' connected to telephone line 37 in parallel with telephone station set 33.

For ease of understanding, this disclosure describes dialing in terms of manual operations performed by a calling person operating keys or push-buttons on a telephone station set such as 31 or 33. A person of skill in the art will recognize, however, that dialing operations also can be performed by a wide variety of manually operated and automatic means. Dialing can produce rotary pulse dialing signals or dual tone multi-frequency (DTMF) signals, and dialing can be entirely manual, automatic in response to a manual actuation of a speed dialing key or a set of keys indicating an abbreviated dialing code, or entirely automatic. An example of an automatic dialing would be a timed auto-dialing operation by FAX machine 33' to initiate message transmission after a period of time or at some preselected time when telephone rates are minimal.

The message service system comprises a voice messaging equipment 20. Although referred to as "voice" messaging equipment, equipment 20 may have the capability of storing messages of a variety of different types. For example, the incoming messages may be audible messages, such as voice messages. Other messages may be text data messages. The voice messaging equipment 20 may also store messages in an image data format such as facsimile. Message service systems having the capability to store messages in a variety of audible and data formats are known, see e.g. U.S. Pat. No. 5,008,926 to Misholi and U.S. Pat. No. 4,652,700 to Matthews et al.

The voice messaging equipment 20 includes a switch 21, a central processing unit 23, a number of voice processing units (VPU) 25 and a data communication unit 27. A digital network 29 carries data signals between the central processing unit 23 and the voice processing units 25. The network 29 also carries stored messages, in digital form, between the various voice processing units 25. The voice messaging equipment 20 also includes T1 type digital links 28 between the switch 21 and each of the voice processing units 25. Messaging equipment of the type shown in simplified form in FIG. 1 is currently available from a number of vendors, such as Octel and Boston Technologies, Inc.

The voice messaging equipment 20 connects to the switching system 10 via a data line 41 between the data unit 17 in the switching system and the data unit 27 in the voice messaging equipment. The line 41 carries data signals between the voice messaging equipment 20 and the switching system 10. The data line 41 may be a simplified message desk interface (SMDI) type trunk or an integrated services digital network (ISDN) facility into the central office exchange switching system 10. For example, FIG. 1 shows an SMDI type data line 41, and further discussions generally refer to the exemplary SMDI type line.

The voice messaging equipment 20 also connects to the switching system 10 via a series of access lines 43 between the switch matrix 11 within the switching system and the switch 21 of the voice message equipment. The access lines 43 may be a multi-line hunt group, formed by a number of T1 type trunk circuits which each carry 24 voice channels in digital time division multiplexed format. The access lines may also be provisioned via an ISDN facility. The embodiment illustrated in FIG. 1 uses T1 type access lines, and further discussions will concentrate on that exemplary embodiment of the access lines. When the switching system 10 directs a call to the voice messaging equipment 20, whether as a forwarded call or as a direct call in response to dialing of a number for accessing the equipment 20, the switching system places the call on any available channel on the multi-line hunt group lines 43.

The switching system 10 can also connect to other message service systems through additional data sets 17 and associated data lines. Although not shown, additional sets of access lines would connect the switching matrix 11 to the equipment within the additional message service systems. Furthermore, if desired, the voice messaging equipment 20 may be connected to receive calls and associated data transmissions from other switching systems similar to system 10.

The central processor unit 23 of the voice messaging equipment typically is a personal computer type device programmed to control overall operations of the voice messaging equipment. Each of the voice processing units 25 also is a personal computer type device. The digital network 29 interconnecting the central processing unit 23 and the voice processing units 25 may be any conventional data network for communication between computers and/or associated peripheral devices. One such network is Ethernet.

The voice processing units include or connect to one or more digital mass storage type memory units (not shown) in which the actual messages are stored. The mass storage units, for example, may comprise magnetic disc type memory devices.

Although not specifically illustrated in the drawing, the voice processing units 25 also include analog to digital coder and digital to analog decoder (CODEC) units and a T1 interface. Each CODEC converts incoming analog messages to digital format for storage and converts stored digital messages to analog for transmission to callers. Each of the T1 interfaces in the voice processing units 25 converts analog signals from the CODEC into digital signals in a format appropriate for transmission over telephone network type T1 trunk circuits and places packets of the digitized data into outgoing time slots on the connected T1 line 28. The T1 interface also demultiplexes and converts to analog incoming signals from the connected T1 line 28, and supplies the analog signals to the CODEC. A T1 line typically carries the equivalent of 24 voice grade communication channels, and the T1 interfaces and CODEC units of the voice processing unit 25 are capable of simultaneously processing 24 voice grade conversations.

When the switching system 10 forwards a call to the voice messaging equipment 20, the switching system 10 transmits data to the central processing unit 23 of the voice messaging equipment indicating which line of the hunt group, i.e. which T1 trunk and which channel on the trunk, that the new call will come in on. This data is transmitted via the data line 41.

The exchange also transmits data via the SMDI trunk or ISDN type data line 41 to indicate what subscriber the call relates to. In the simplest example, where the called subscriber has only one assigned number, the subscriber identifying data would be the directory number assigned to the called subscriber's line. The central processing unit 23 uses the hunt group line information and the subscriber's directory number to internally route the forwarded call though switch 21 and one of the internal T1 links 28 to an available voice processing unit 25.

For each party who subscribes to the voice mail service provided by the voice messaging equipment, the central processing unit 23 stores information designating one of the voice processing units 25 as the "home" unit for that subscriber. Each voice processing unit 25 stores generic elements of prompt messages in a common area of its memory. Personalized elements of prompt messages, for example recorded representations of each subscriber's name spoken in the subscriber's own voice, are stored in designated memory locations within the subscriber's "home" voice processing unit.

Each time a call comes in to the voice message equipment, the central processing unit 23 controls the switch 21 to provide a multiplexed voice channel connection through to one of the voice processing units 25. Typically, the call connection goes to the "home" voice processing unit for the relevant subscriber. The message service subscriber is identified by data transmitted from the switching system 10, as described above, if the call is a forwarded call. Alternatively, the subscriber is identified by data transmitted by the subscriber when the subscriber calls in to access the subscriber's mailbox to retrieve stored messages or to activate other services provided by the voice messaging equipment. If all 24 T1 channels to the "home" voice processing unit are engaged, the central processing unit 23 controls switch 21 to route the call to another voice processing unit 25 which is currently available.

The voice processing unit connected to the call retrieves prompt messages and/or previously stored messages from its memory and transmits them back to the calling party via its CODEC and T1 interface, the internal T1 line 28, switch 21, a T1 channel within one of the access lines 43, switch matrix 11 and the calling arty's telephone line 35 or 37. The voice processing unit 25 connected to the call receives incoming messages from the caller through a similar route and stores those messages in digital form in its associated mass storage device.

When the incoming call is a forwarded call, the connected voice processing unit 25 provides an answering prompt message to the caller, typically including a personalized message recorded by the called subscriber. After the prompt, the voice processing unit 25 records a message from the caller and identifies that stored message as one for the subscriber's mailbox.

At times the connected voice processing unit will not have all necessary outgoing messages stored within its own associated memory. For example, a forwarded call normally will be connected to the called subscriber's "home" voice processing unit 25, but if the home unit is not available the forwarded call will be connected to a voice processing unit 25 other than the subscriber's home voice processing unit. In such a case, the connected unit 25 requests and receives from the home unit 25 the personalized components of the answering prompt message via the data network 29. The connected voice processing unit 25 will store any incoming message in its own associated memory together with data identifying the message as one stored for the called subscriber's mailbox. As a result, the system 20 actually may store a number of messages for any given subscriber or mailbox in several different voice processing units 25. Subsequently, when the subscriber calls in to the voice messaging system to access the mailbox, the call is connected to one voice processing unit 25. Again, this call typically goes to the home unit but would go to a different available unit if the home unit is not available at the time. In response to appropriate DTMF control signals received from the subscriber, the connected voice processing unit retrieves the subscriber's messages from its own memory and plays the messages back to the subscriber. If any messages are stored in other voice processing units, the connected unit 25 requests and receives from the other units 25 any messages for the subscriber's mailbox those units have actually stored.

In message service systems of the type discussed above, a subscriber's "mailbox" does not actually correspond to a particular area of memory. Instead, the messages are stored in each "mailbox" by storing appropriate identification or tag data to identify the subscriber or subscriber's mailbox which each message corresponds to.

For normal telephone operation, for example when a caller at one telephone station 33 wants to call a person at another telephone station 31, the caller lifts the handset of the telephone station set off-hook and dials a directory telephone number assigned to the destination telephone line 35. If the destination telephone line 35 has only one assigned directory number, the switching system 10 determines whether line 35 is available, and if so, applies a standard two-on four-off type ringing signal to line 35. If a person is present at the called destination, the person lifts the handset of telephone 31 off-hook, and the call is completed.

Assume, for example, that the subscriber assigned to line 35 subscribes to the voice mail service provided by voice messaging equipment 20. As part of this subscription, the central processing unit 13 will store data indicating that call forwarding is active for the line 35 and an indication that forwarded calls should be routed to the voice messaging equipment 20. In this case, when the party using telephone 33 dials the directory number assigned to line 35, if the line is busy or the call goes unanswered for a set period of time, the switching system 10 forwards the call to the voice messaging equipment 20, as described in more detail below.

When a customer subscribes to a multiple directory number per line type service, such as the Bell Atlantic service referred to as IdentaRing TM, that subscriber's line is assigned a main directory telephone number, and one to three secondary numbers. As discussed in detail below, calls coming in based on a dialing of the main number result in a standard ringing sound; and calls coming in based on a dialing of one of the secondary numbers result in a corresponding distinctive ringing sound.

Now assume that the subscriber assigned to line 37 subscribes to a Multiple Directory Numbers per Line or "MDNL" type service. When a party using telephone set 31 calls a person at the premises of telephone 33, the person using telephone 31 lifts the handset off-hook and dials one of the numbers assigned to line 37. The switching system 10 determines whether line 37 is available, and if so, applies a ringing signal to line 35 which corresponds to the dialed one of the assigned numbers. For example, if the caller at station 31 dialed the main number assigned to the subscriber line 37, the switching system 10 applies a standard ringing signal (two seconds on, four seconds off) to the subscriber's line. If the caller dialed a second or subsequent number assigned to the line 37, the switching system 10 applies a corresponding distinctive ringing signal to the line. If a person is present at the called destination, the person knows which number the caller dialed based on the ringing sound produced by telephone set 33. If the person decides to answer the call, they lift the handset of telephone 33 off-hook, and the call is completed.

In recent years, control devices have been developed which detect the different types of ringing signals applied to telephone lines having a multiple directory numbers per line type service. These control devices trigger an associated piece of customer premises equipment, such as a facsimile device, an answering machine etc., such that the controlled equipment responds to calls only upon receipt of a selected one of the possible incoming ringing signals. This type of control serves to route calls for a selected one of the directory numbers, corresponding to the selected ringing signal, to the one equipment controlled by the device. For example, if such a control device is built into or otherwise associated with the FAX device 33', and programmed to respond to the ringing signal corresponding to one of the secondary directory numbers, the control device will activate the FAX machine only upon detection of the selected ringing signal. Thus calls coming in for the secondary number are directed to the FAX machine 33' as facsimile type calls, and the FAX machine 33' will execute a standard reception procedure or a polling responsive transmission procedure.

If the voice messaging equipment 20 has the capability to handle both voice messages and fax messages, the subscriber can choose to have one number of those assigned to the line correspond to a data device such as FAX machine 33'. The central processing unit 23 would store data to control operation of the switch 21 and the voice processing units 25 such that forwarded calls associated with that directory number would be routed to a voice processing unit 25 with the capability of storing and retrieving the subscriber's messages in facsimile format.

Figure 2:
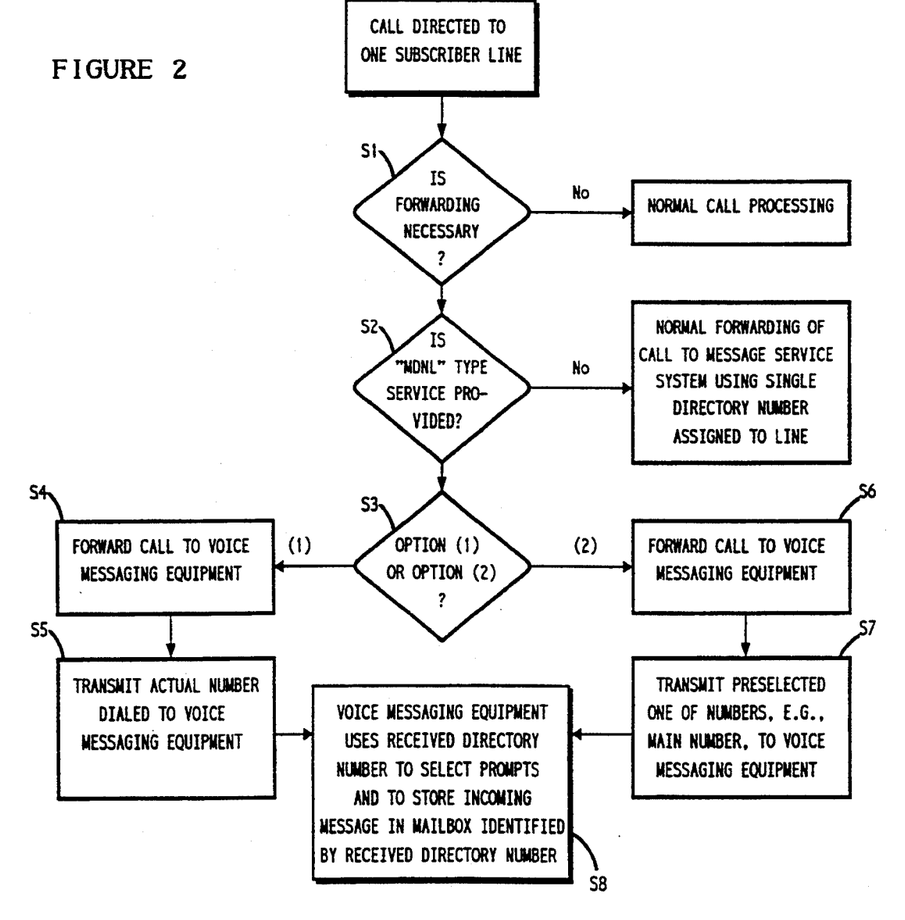
FIG. 2 is a flow chart illustrating a first embodiment of the inventive call processing routine.

FIG. 2 shows an embodiment of the call processing method of the present invention wherein at least some subscribers have both multiple directory number's assigned to one line and a voice messaging service provided for calls forwarded from that line. As shown, a first step S1 in the method is to determine whether forwarding of a call directed to the line is necessary.

If forwarding is not necessary, the system processes the call in the normal manner. If the line is busy, the switching system may terminate the call to a busy tone or further process the call in a manner depending upon the features assigned to the line, e.g., call waiting, etc. If the line is available, the switching system 10 applies a ringing signal to the line and connects the line from which the call originated to the called line through the switching matrix 11. In cases where the called line is assigned a plurality of directory numbers, the ringing signal applied will correspond to whichever one of the assigned numbers the caller actually dialed.

The central processing unit 13 of the switching system 10 stores a translation table. The translation table includes data regarding the services provided to each telephone line, such as line 35 or line 37, which are connected to the switching system 10. Among the information stored in the translation table is an indication of whether to provide call forwarding for calls directed to any identified subscriber line.

There are a number of types of call forwarding provided by telephone networks. In the most common form, calls are forwarded when the system can not complete the call, e.g. because the line is busy or the call goes unanswered. For forwarding of the unanswered calls, the subscriber can specify a ringing interval, and after expiration of this interval without an answer, the system considers the call unanswered and forwards the call. Another type of call forwarding, referred to as "variable" call forwarding, causes forwarding at times when the subscriber has activated the service. The system forwards calls to a number which the subscriber input at the time of service activation, by using DTMF dialing signals. The subscriber typically activates variable call forwarding by dialing *72 on the line and typically deactivates forwarding by dialing *73 on the line. Another type of call forwarding forwards particular calls based on the directory number of the line from which an incoming call originates.

The present invention is useful with each type of call forwarding. For example, using variable call forwarding, if the subscriber wanted to stop incoming calls for some period, the subscriber would dial *72 and the directory number for the multi-line hunt group 43 into the voice messaging equipment 20. Subsequently, the switching system 10 would route all calls directed to the subscriber's line to the voice messaging equipment until such time as the subscriber dials *73 to cancel this call forwarding. To work with the various different kinds of call forwarding, the translation table stored within the central processing unit 13 therefore also stores data indicating the type of call forwarding subscribed to and/or the criteria on which the decision to forward is based.

To determine whether or not the current call should be forwarded, as shown at step S1, the central processing unit 13 retrieves from the translation table data associated with the called subscriber line indicating whether or not to provide call forwarding and the criteria for determining whether or not to forward a particular call. For example, if the system provides the subscriber a call forwarding whenever a call can not be completed, the data indicates that call forwarding service is active and that calls must be forwarded if the called subscriber line is busy or does not answer within a set number of ringing signals. The central processing unit then determines if the called line is busy or the call has gone unanswered for the specified number of rings, and thereby determines that forwarding of the current call is necessary.

If step S2 results in a determination that forwarding of the call is necessary, the method proceeds with a determination of whether or not the called subscriber line has assigned to it a plurality of directory numbers, as shown at step S2 in FIG. 2. To perform this step the central processing unit 13 now accesses the translation table and retrieves data associated with the called subscriber indicating whether or not to provide a multiple directory number per line (MDNL) type service to this particular subscriber's line.

If the called line is not associated with an MDNL type multiple number service as determined at step S2, the switching system forwards the call to the voice messaging equipment 20 in the normal manner. For example, the telephone network switching system 10 forwards the voice grade call to the voice messaging equipment via a T1 channel on the multi-line hunt group type access lines 43. The central processor unit 13 also provides the single directory number assigned to the called line to the input/output device 15 and therethrough to the data unit 17 for transmission via the SMDI data line 41 and data unit 27 to the central processing unit 23. The central processing unit 23 uses the received directory number to control the switch 21 and one of the voice processing units 25 to provide appropriate personalized prompts and to store voice messages from the caller in the called subscriber's mailbox.

If the called line is associated with an MDNL type multiple number service as determined at step S2, the central processing system 13 proceeds with execution of step S3. At step S3 the central processing unit 23 accesses appropriate data in the translation table to determine which option the subscriber previously selected. The first option (1) is to send the directory number actually dialed to the message service system with the forwarding of each call, and the second option (2) is to always transmit a predetermined number to the voice messaging equipment. The predetermined number is one of the multiple directory numbers assigned to the one subscriber line, and typically this one number is the main directory number which the switching system 10 associates with the called subscriber line.

If the subscriber selected option (1), the telephone network switching system 10 forwards the voice grade call to the voice messaging equipment 20 as shown at step S4. The system 10 forwards the call via a T1 channel on the multi-line hunt group type access lines 43. Also, the directory number actually dialed is transmitted to the voice messaging equipment 20 in step S5. Specifically, the central processor unit 13 provides the directory number actually dialed to the input/output device 15 and therethrough to the data unit 17 for transmission via the SMDI (or ISDN) data line 41 and data unit 27 to the central processing unit 23. The central processor unit 23 uses the received directory number to control the switch 21 and one of the voice processing units 25 to provide appropriate personalized prompts and to store voice messages from the caller in a mailbox specifically identified by the received directory number, as shown at step S8.

As a result of transmitting the actual number dialed for each call directed to a subscriber's line having a multiple directory number service, the voice messaging equipment can provide different personalized prompts corresponding to each of the assigned directory numbers. Also, the voice messaging equipment stores incoming messages in different mailboxes corresponding to the different directory numbers actually dialed. The different numbers and mailboxes can be assigned to different persons residing at the subscriber's premises. For example, calls to one number would be for the parents, and the parents' messages would go into one corresponding nailbox. Calls to a second number may be for a teenager, and messages for the teenager would go into a separate second mailbox. Alternatively, if the voice messaging equipment is set up to store both voice and data messages, the different numbers and mailboxes can be assigned to different types of communication, i.e. voice or data.

Also, if the subscriber has data devices of two different types, e.g. text and facsimile, and the message service system can handle both types of data, the message service system can provide the subscriber a different mailbox for each type of data. Calls associated with different data devices would use different assigned directory numbers and corresponding distinctive ringing signals. The message service system would use the received directory number to store messages of different data types in different mailboxes. This processing may be useful even if the message service system was of a type which did not process voice messages.

Returning to step S3, if the central processing unit 13 determined that the subscriber has selected option (2), call processing proceeds to step S6. At this point, the switching system 10 forwards the voice grade call to the voice messaging equipment 20 via a T1 channel on the multi-line hunt group type access lines 43. Also, the predetermined directory number is transmitted to the voice messaging equipment 20 in step S7. The central processor unit 13 provides the predetermined directory number, typically the main number, to the input/output device 15. The input/output device 15 transfers the predetermined directory number to the data unit 17 for transmission via the SMDI (or ISDN) data line 41 and data unit 27 to the central processing unit 23. The central processor unit 23 uses the received directory number to control the switch 21 and one of the voice processing units 25 to provide appropriate personalized prompts and to store voice messages from the caller in a mailbox identified by the received directory number, as shown at step S8. As a result of this processing of each call directed to the subscriber's line, the voice messaging equipment provides a single set of personalized prompts for all calls forwarded from the line regardless of the directory number actually dialed, regardless of which of the assigned numbers the caller actually dialed: Also, the voice messaging equipment stores incoming messages in a single mailbox assigned to the subscriber.

The single mailbox can be internally partitioned, but to reach separate sub-mailboxes for different persons the voice messaging equipment would send out a prompt for a selection. The caller would push one or more buttons on a DTMF telephone to indicate which sub-mailbox to access. After the DTMF selection, the voice messaging equipment may provide a personalized prompt corresponding to a selected sub-section of the mailbox, then store messages in that part of the partitioned mailbox. Typically, the rates for a single mailbox, even if partitioned, are lower than the rates charged for a corresponding number of separate mailboxes. The need for selection inputs by the caller, however, makes the partitioned mailbox somewhat less convenient to use.

The order of the three determinations made in steps S1 to S3 is illustrative only, and other orders of the determination steps will achieve the desired call routing. For example, the determination of whether or not forwarding is necessary may follow the determination of whether or not the called subscriber line has assigned to it a plurality of directory numbers.

Figure 3:
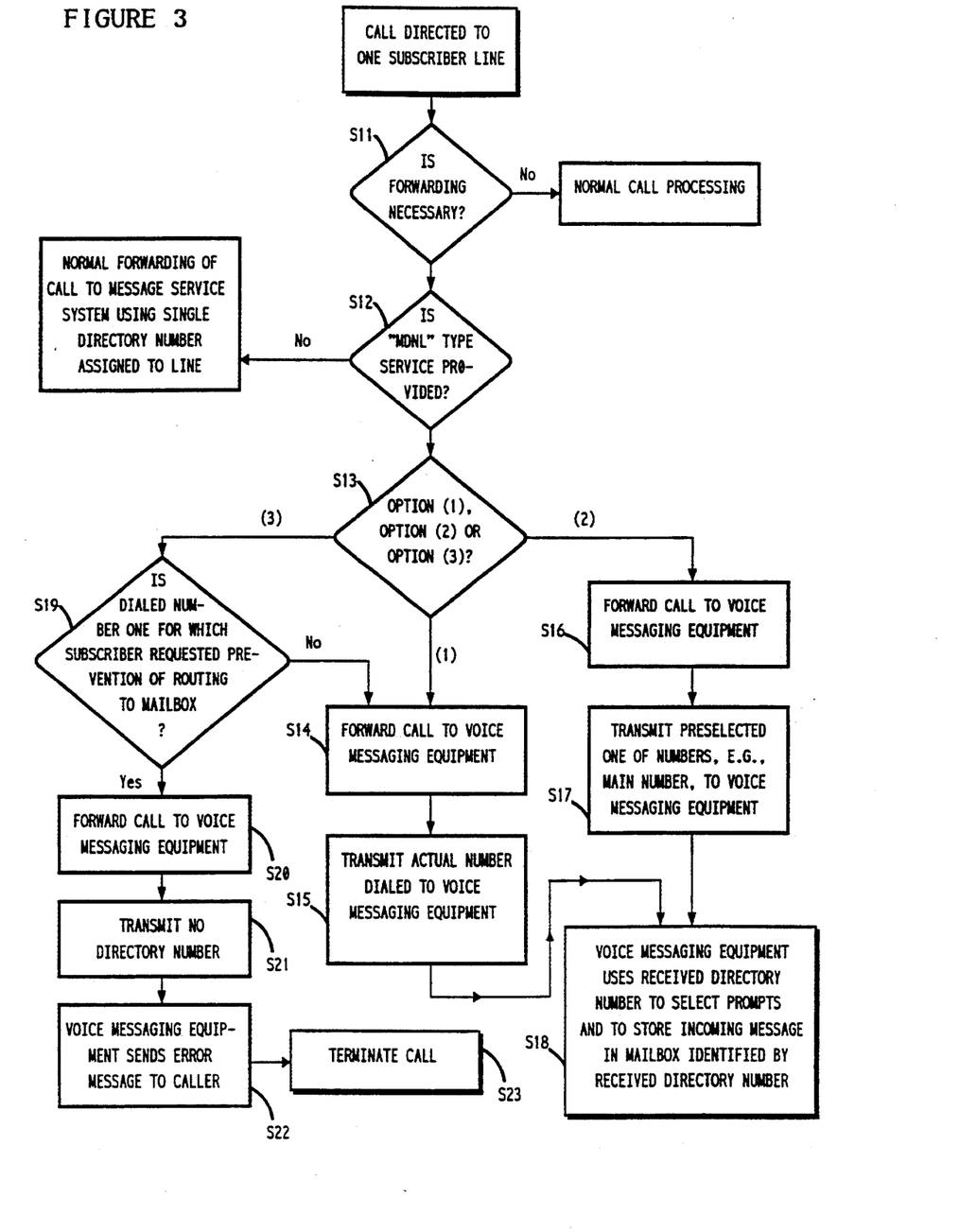
FIG. 3 is a flow chart illustrating a second embodiment of the inventive call processing routine.

FIG. 3 shows a second embodiment of the call processing method of the present invention wherein certain subscribers have both multiple directory number's assigned to one line and a voice messaging service provided for calls forwarded from that line. As shown, a first step S11 in the method is to determine whether forwarding of a call directed to the line is necessary. The central processing unit 13 determines whether or not the current call should be forwarded, as shown at step S11, in the manner discussed in detail above with regard to step S1 of FIG. 2. As in the previous embodiment, if forwarding is not necessary, the system processes the call in the normal manner.

If forwarding is necessary, the method proceeds with a determination of whether or not the called subscriber line has assigned to it a plurality of directory numbers, as shown at step S12 in FIG. 3. To perform this step the central processing unit 13 now retrieves from the translation table data indicating whether or not the to provide a multiple directory number per line (MDNL) type service to this called subscriber's line. If the called line is not associated with an MDNL type multiple number service as detected at step S12, the switching system 10 forwards the call to the voice messaging equipment 20 in the normal manner.

If the called line is associated with an MDNL type multiple number service, as detected at step S12, the central processing system 13 proceeds with execution of step S13. At step S13 the central processing unit 23 accesses appropriate data in the translation table to determine which option the subscriber previously selected.

As in the FIG. 2 embodiment, the first option (1) is to send the directory number actually dialed to the message service system with the forwarding of each call, and the second option (2) is to always transmit a predetermined number to the voice messaging equipment. The predetermined number is one of the multiple directory numbers assigned to the one subscriber line, and again typically this one number is the main directory number which the switching system 10 associates with the called subscriber line.

If the subscriber selected option (1), the telephone network switching system 10 forwards the voice grade call to the voice messaging equipment 20 as shown at step S14. Also, the directory number actually dialed is transmitted to the voice messaging equipment 20 in step S15. The system 10 forwards the call and transmits the actual dialed directory number in the manner discussed above with regard to the steps S4 and S5 of FIG. 2. The central processor unit 23 uses the received directory number to control the switch 21 and one of the voice processing units 25 to provide appropriate personalized prompts and to store voice messages from the caller in a mailbox specifically identified by the received directory number, as shown at step S18.

Returning to step S13, if the central processing unit 13 determined that the subscriber has previously selected option (2), call processing proceeds to step S6. At this point, the switching system 10 forwards the voice grade call to the voice messaging equipment 20. Also, the predetermined directory number is transmitted to the voice messaging equipment 20 in step S17. The actual forwarding and number transmissions of steps S16 and S17 are performed in the same manner as discussed above with regard to the steps S6 and S7 of FIG. 2. The central processor unit 23 uses the received directory number to control the switch 21 and one of the voice processing units 25 to provide appropriate personalized prompts and to store voice messages from the caller in a mailbox identified by the received directory number, as shown at step S18.

To this point, the processing is essentially the same as that of FIG. 2, with the exception that step S13 determined which of three options the called subscriber previously selected. The third option (3) indicates a desire to prevent routing and/or processing of the call in a manner which would result in message storage by the voice messaging equipment for calls to one or more specified numbers from the set of numbers assigned to the subscriber's line. This prevention of storage can be performed in a number of ways, of which FIG. 3 illustrates a preferred embodiment. Alternative approaches to preventing message storage will be discussed later.

In the illustrated embodiment, option (3) is to have the system forward calls and transmit actual dialed directory number unless the actual number dialed is one for which the called subscriber has requested prevention of routing to the mailbox(es). If in step S13 it was determined that the subscriber selected option (3), the call processing method proceeds to step S19. In step S19, the central processing unit 13 compares the actual dialed directory number to the one or more numbers the called subscriber has preselected for message blocking. If the dialed number does not correspond to one of the preselected numbers, the method proceeds to step S14. The telephone network switching system 10 forwards the voice grade call to the voice messaging equipment 20, as shown at step S14, the directory number actually dialed is transmitted to the voice messaging equipment 20 in step S15, and the voice messaging equipment 20 uses the received directory to provide the personalized prompts and store incoming voice messages from the caller in a mailbox specifically identified by the received directory number, as shown at step S18.

If the comparison in step S19 results in a determination that the number actually dialed corresponds to one of the preselected numbers, the method proceeds with prevention of call completion to the subscriber's mailbox(es). The switching system 10 can actually block forwarding of the call to the voice messaging equipment 20. In the illustrated embodiment, the call is forwarded to the voice messaging equipment 20 at step S20. The switching system 10, however, does not transmit any directory number (step S21) for use by voice messaging equipment 20 in processing the call. Consequently, the voice messaging equipment 20 does not have sufficient information to properly route the call and treats the call as an error. In step S22, the voice messaging equipment transmits an error message to the caller. The error message can be a tone, such as a busy signal, or a synthesized speech prompt message of some sort informing the caller that the call has been forwarded but otherwise can not be completed as dialed. After the error message, the voice messaging equipment 20 terminates the call at step S23.

This prevention of completion to the subscriber's mailbox can be useful in a variety of situations. For example, the subscriber at station 33 may have a FAX machine 33' set up to respond to the distinctive ringing signal corresponding to the second assigned directory number, but the messaging equipment 20 may not be capable of processing facsimile information. In this case the subscriber would designate the second number for blocking. Calls using the main number would be forwarded and processed by the voice messaging equipment 20 in the manner discussed above. Facsimile calls, however, would result in an error message. The error message would not correspond to any one of the handshaking tones normally transmitted by an answering facsimile machine. As a result, the calling facsimile machine would not receive an expected handshake signal and would assume the call was not properly completed.

The prevention of completion to the subscriber's mailbox provided by the method of FIG. 3 would also allow a subscriber to select to route calls using the main number and a second number used for business purposes to the appropriate voice mailboxes. At the subscriber's option, calls to a third directory number assigned to a teenage member of the subscriber's household may result only in the error message transmission and termination without storage of an incoming message. The subscriber therefore need not pay for a separate mailbox for the teenager.

As mentioned earlier, the present invention can use a number of alternate procedures when blocking storage of messages for calls using certain preselected numbers. For example, the switching system may forward the call to an internal error message source such as a busy tone generator. Thus calls using a preselected number would not be forwarded to the message service system. In another alternative, the step S20 would be altered to send a dummy number which system 20 would recognize as an error.

The method of FIG. 3 may also be modified so that instead of sending the actual number dialed, the switching system 10 would transmit only a predetermined one of the assigned numbers, when the call is not to be blocked. Recall that if the decision in step S19 was that the dialed number did not correspond to one of the preselected numbers, the method proceeded to step S14. With this latest modified procedure, if the dialed number does not correspond to one of the preselected numbers, the method proceeds instead to step S16. At this point, the switching system 10 forwards the voice grade call to the voice messaging equipment 20, the preselected directory number is transmitted to the voice messaging equipment 20 in step S17, and the voice messaging equipment uses the received number to provide personalized prompts and to incoming voice messages in a single mailbox identified by the received directory number, as shown at step S8.

Set up and/or modification of services provided by the present invention will now be described. To subscribe to new telephone services or modify existing services, particularly those discussed above, a customer typically will call in to a business office of the local telephone company. A customer representative or sales person will conduct a conversation with the customer regarding new services or modifications which the customer desires. During this conversation, the sales person uses a computer terminal to display information regarding available services and information about the calling customer, if that person is an existing subscriber. The sales person will also use the terminal to enter selections of new services or modifications of existing services, as selected by the calling customer during the conversation.

For example, the terminal would display an indication that a voice mail service is available through the local telephone company. The sales person would discuss this service with the calling customer. If the customer chooses to subscribe to the voice mail service, the sales person inputs this selection via the computer terminal. Since call forwarding is required for voice mail service, the input information would also indicate that the telephone company is to provide some form of call forwarding to this subscriber. The sales person would also discuss the number of rings or time interval the customer desires before an unanswered call will be forwarded to the message service system, and would input an appropriate selection from the subscriber.

Another available service would be a multiple directory number per line (MDNL) type service, such as IdentaRing ™. The sales person would discuss this service with the calling customer. If the customer chooses to subscribe to the MDNL service, the sales person inputs this selection via the computer terminal. If the customer has now selected both the voice mail service and the MDNL service, the sales person's terminal would now display and the sales person would explain the two (FIG. 2) or three (FIG. 3) options available.

Assume now for simplicity that the local telephone company offers the two options discussed above with regard to FIG. 2. With the first option, the subscriber has each of the assigned directory numbers transmitted as actually dialed for each call. Transmission of each directory number to the voice messaging equipment allows storage in a plurality of separate mailboxes. The sales person therefore would input the selection of the first option and any further information needed to set up the separate mailboxes in the voice messaging equipment in correspondence to the different assigned directory numbers. If facsimile or data communications are involved, this latest input information would indicate which assigned number the customer wants associated with the data or facsimile type message communication. The second option allows the subscriber to choose to have the switching system transfer only one number, presumably the main number, to the voice messaging equipment. Correspondingly, the subscriber would choose to subscribe to a single mailbox provided by the voice mail service. At this point, the sales person may also offer the customer the ability to partition the mailbox. After description of this option and the corresponding choice to partition or not partition the mailbox, the sales person inputs the customer's selection into the terminal. Similar procedures would be used to input all necessary information to provide the subscriber the three options available with the call processing method of FIG. 3.

The above discussed procedures would continue for all other services offered by the local telephone company. After the sales person and the customer have discussed all of the available services, and the sales person has entered all of the selection data, the computer system executes a validation routine to insure that all data inputs are complete and compatible with existing network services and procedures. For example, the validation routine would prevent entry of service changes that would create infinite processing loops that would cause telephone network switches to malfunction. Once validated, appropriate portions of the new or modified service data are transferred into the central processing unit 13 and the central processing unit 23, to make the services subscribed to available on the subscriber's line. The above described procedures for programming the communication system to provide a customer with new or modified special services can be executed using the recent change programming system disclosed in U.S. Pat. No. 5,012,511.

From the above detailed description it becomes clear that the present invention provides improved control over the interactions between a multiple directory number per line type service and a message storage service. In particular, the invention allows each subscriber assigned to an individual telephone line useful options to select how these two services are set up and relate to each other so as to customize these services to the subscriber's unique needs.

I claim:

1. A method of call processing in a communication system including at least one switching system connected to a plurality of subscriber lines and at least one message service system connected to the at least one switching system, said method of call processing comprising the steps of:
    determining that a call initiated by dialing a directory number assigned to one of the subscriber lines should be forwarded to the message service system;
    determining if the one line has been assigned a plurality of directory numbers;
    determining which of the following options a subscriber associated with the one line has selected:
        (1) transmitting the dialed directory number for each call forwarded to the message service system, and
        (2) transmitting a predetermined one of the plurality of directory numbers assigned to the one line for all calls forwarded to the message service system;
    forwarding said call directed to one of the subscriber lines to the message service system; and
    transmitting either the dialed directory number or the predetermined one of the plurality of directory numbers assigned to the one line to the message service system based on whether the subscriber associated with the one line has selected option (1) or option (2).

2. A method of call processing in a communication system including at least one switching system connected to a plurality of subscriber lines and at least one message service system connected to the at least one switching system, said method of call processing comprising the steps of:
    determining that a call initiated by dialing a directory number assigned to one of the subscriber lines should be forwarded to the message service system;
    determining if the one line has been assigned a plurality of directory numbers;
    determining which of the following options a subscriber associated with the one line has selected:
        (1) transmitting the dialed directory number for each call forwarded to the message service system, and
        (2) transmitting a predetermined one of the plurality of directory numbers assigned to the one line for all calls forwarded to the message service system;
    forwarding said call directed to one of the subscriber lines to the message service system;
    transmitting either the dialed directory number or the predetermined one of the plurality of directory numbers assigned to the one line to the message service system based on whether the subscriber associated with the one line has selected option (1) or option (2); and
    completing the forwarded call to the message service system and storing a message in a mailbox corresponding to the transmitted directory number, such that
    if the subscriber associated with the one line has selected transmitting of the dialed directory number to the message service system for each forwarded call, the message stored as result of the call is stored in one of a plurality of mailboxes associated the one line based on which one of the plurality of directory numbers assigned to the one subscriber line corresponds to the dialed directory numbers, and
    if the subscriber associated with the one line has selected transmitting the predetermined one directory number to the message service system for all forwarded calls, the message stored as result of the call is always stored in a single mailbox assigned to the one subscriber line.

3. A method of call processing in a communication system including at least one switching system connected to a plurality of subscriber lines and at least one message service system connected to the at least one switching system, said method of call processing comprising the steps of:
    determining that a call initiated by dialing a directory number assigned to one of the subscriber lines should be forwarded to the message service system;
    determining if the one line has been assigned a plurality of directory numbers;
    determining which of the following options a subscriber associated with the one line has selected:
        (1) transmitting the dialed directory number for each call forwarded to the message service system, and
        (2) transmitting a predetermined one of the plurality of directory numbers assigned to the one line for all calls forwarded to the message service system;
    forwarding said call directed to one of the subscriber lines to the message service system; and
    transmitting either the dialed directory number or the predetermined one of the plurality of directory numbers assigned to the one line to the message service system based on whether the subscriber associated with the one line has selected option (1) or option (2); and completing the forwarded call to the message service system and storing a message in a mailbox corresponding to the transmitted directory number, such that if the subscriber associated with the one line has selected forwarding of the dialed directory number to the message service system for each forwarded call, the message stored as result of the call is stored in one of a plurality of different types of mailboxes associated the one subscriber line based on which one of the plurality of directory numbers assigned to the one line the message service system actually receives.

4. A method as in claim 3, wherein one of said plurality of different types of mailboxes is a mailbox for storing audible messages, and another of said plurality of different types of mailboxes is a mailbox for storing a type of data message.

5. A method as in claim 4, wherein the mailbox for storing a type of data message stores facsimile messages.

6. A method as in claim 1, wherein the step of determining if the call should be forwarded comprises the step of determining if the one subscriber line is busy.

7. A method as in claim 1, wherein the step of determining if the call should be forwarded comprises the step of determining if there is no answer of the call on the one line after a predetermined number of rings, said predetermined number of rings having been previously specified by the subscriber associated with the one line.

8. A method as in claim 1, wherein the step of determining if the call should be forwarded comprises the step of determining if a variable call forwarding option has been activated instructing the network to forward calls until deactivated.

9. A method of call processing in a communication system including at least one switching system connected to a plurality of subscriber lines and at least one message service system connected to the at least one switching system, said method of call processing comprising the steps of:

determining that a call initiated by dialing a directory number assigned to one of the subscriber lines should be forwarded to the message service system;

determining if the one line has been assigned a plurality of directory numbers, by accessing a translation table of stored data relating to services provided to the subscriber associated with the one line;

determining which of the following options a subscriber associated with the one line has selected:
(1) transmitting the dialed directory number for each call forwarded to the message service system, and
(2) transmitting a predetermined one of the plurality of directory numbers assigned to the one line for all calls forwarded to the message service system;

forwarding said call directed to one of the subscriber lines to the message service system; and transmitting either the dialed directory number or the predetermined one of the plurality of directory numbers assigned to the one line to the message service system based on whether the subscriber associated with the one line has selected option (1) or option (2).

10. A method of call processing in a communication system including at least one switching system connected to a plurality of subscriber lines and at least one message service system connected to the at least one switching system, said method of call processing comprising the steps of:

determining that a call initiated by dialing a directory number assigned to one of the subscriber lines should be forwarded to the message service system;

determining if the one line has been assigned a plurality of directory numbers;

accessing a translation table of stored data relating to services provided to a subscriber associated with the one line to determine which of the following options the subscriber associated with the one line has selected:
(1) transmitting the dialed directory number for each call forwarded to the message service system, and
(2) transmitting a predetermined one of the plurality of directory numbers assigned to the one line for all calls forwarded to the message service system;

forwarding said call directed to one of the subscriber lines to the message service system; and transmitting either the dialed directory number or the predetermined one of the plurality of directory numbers assigned to the one line to the message service system based on whether the subscriber associated with the one line has selected option (1) or option (2).

11. A method as in claim 1, wherein each of the plurality of subscriber lines is a telephone line and each of the plurality of directory numbers comprises a telephone number.

12. A method of call processing in a communication system including at least one switching system connected to a plurality of subscriber lines and at least one message service system connected to the at least one switching system, said method of call processing comprising the steps of:

determining if a call initiated by dialing of a directory number assigned to one of the subscriber lines should be forwarded to the message service system;

determining if the one line has been assigned a plurality of directory numbers;

determining which of the following options a subscriber associated with the one line has selected:
(1) transmitting the dialed directory number for each call forwarded to the message service system,
(2) transmitting a predetermined one of the plurality of directory numbers assigned to the one line for all calls forwarded to the message service system, and
(3) transmitting one of the directory numbers assigned to the one line to the message service system unless the dialed directory number corresponds to a preselected one of the plurality of directory numbers assigned to the one line;

if the subscriber associated with the one line has selected option (1) or option (2), forwarding the call to the message service system, and transmitting either the dialed directory number or the predetermined one of the plurality of directory numbers assigned to the one line to the message service system based on whether the subscriber associated with the one line has selected option (1) or option (2);

if the subscriber associated with the one line has selected option (3) and the dialed directory number does not correspond to said preselected one of the plurality of directory numbers assigned to the one line, forwarding the call to the message service system, and transmitting one of the directory numbers assigned to the one line to the message service system; and if the subscriber associated with the one line has selected option (3) and the dialed directory number corresponds to said preselected one of the plurality of directory numbers assigned to the one line, preventing effective forwarding of the call to the message service system.

13. A method as in claim 12, wherein the preventing of effective forwarding of the call to the message service system comprises forwarding the call to the message service system and transmitting no directory number to the message service system.

14. A method as in claim 12, wherein the preventing of effective forwarding of the call to the message service system comprises blocking forwarding of the call to the message service system.

15. A method as in claim 12, wherein if the subscriber associated with the one line has selected option (3) and the dialed directory number does not correspond to said preselected one of the plurality of directory numbers assigned to the one subscriber line, the directory number transmitted to the message service system is the dialed directory number.

16. A method as in claim 12, wherein if the subscriber associated with the one line has selected option (3) and the dialed directory number does not correspond to said preselected one of the plurality of directory numbers assigned to the one subscriber line, the directory number transmitted to the message service system is a prespecified one of the directory numbers assigned to the one line.

17. A communication system comprising:
a plurality of subscriber communication lines;
a message service system for storing incoming messages in a plurality of mailboxes;
a switching system providing selective communication connections between said plurality of subscriber communication lines; and
means for connecting the message service system to the switching system such that said switching system also selectively provides communication connections between the message service system and the subscriber communication lines, wherein:
said switching system comprises programmed control means for responding to a call initiated by dialing a directory number assigned to one of the subscriber communication lines by determining if forwarding of the call is necessary;
said programmed control means also determines if the one subscriber communication line has been assigned a plurality of directory numbers;
said programmed control means also determines which of the following options a subscriber associated with the one subscriber communication line has selected:
(1) transmitting the dialed directory number for each call forwarded to the message service system, and
(2) transmitting a predetermined one of the plurality of directory numbers assigned to the one subscriber communication line for all calls forwarded to the message service system;
said switching system further comprises means for forwarding the call to the message service system, and means for transmitting either the dialed directory number or the predetermined one of the plurality of directory numbers assigned to the one subscriber communication line to the message service system based on whether the subscriber associated with the one line has selected option (1) or option (2); and
said message service system comprises means for storing an incoming message in an appropriate one of the mailboxes in response to the number transmitted to the message service system.

18. A communication system comprising:
a plurality of subscriber communication lines;
a message service system for storing incoming messages in a plurality of mailboxes;
a switching system providing selective communication connections between said plurality of subscriber communication lines; and
means for connecting the message service system to the switching system such that said switching system also selectively provides communication connections between the message service system and the subscriber communication lines, wherein:
said switching system comprises programmed control means for responding to a call initiated by dialing a directory number assigned to one of the subscriber communication lines by determining if forwarding of the call is necessary;
said programmed control means also determines if the one subscriber communication line has been assigned a plurality of directory numbers;
said programmed control means also determines which of the following options a subscriber associated with the one subscriber communication line has selected:
(1) transmitting the dialed directory number for each call forwarded to the message service system, and
(2) transmitting a predetermined one of the plurality of directory numbers assigned to the one subscriber communication line for all calls forwarded to the message service system;
said switching system further comprises means for forwarding the call to the message service system, and means for transmitting either the dialed directory number or the predetermined one of the plurality of directory numbers assigned to the one subscriber communication line to the message service system based on whether the subscriber associated with the one line has selected option (1) or option (2); and
said message service system comprises means for storing an incoming message in an appropriate one of the mailboxes in response to the number transmitted to the message service system, wherein the means for storing an incoming message in an appropriate one of the mailboxes comprises:
means for storing the message received during the forwarded call in one of a plurality of mailboxes associated the one subscriber communication line based on which one of the plurality of directory numbers assigned to the one subscriber communication line the message service system actually receives, if the subscriber associated with the one line has selected option (1); and means for storing the message received as result of the call in a single mailbox associated with the one subscriber communication line, if the subscriber associated with the one line has selected option (2).

19. A communication system as in claim 17, wherein the switching system comprises at least one central office telephone switch.

20. A communication system as in claim 19, wherein the subscriber communication lines comprise telephone lines.

21. A communication system as in claim 17, wherein the message service system comprises means for storing audible messages.

22. A communication system comprising:
a plurality of subscriber communication lines;
a message service system for storing incoming messages in a plurality of mailboxes, wherein the message service system comprises means for storing data messages;
a switching system providing selective communication connections between said plurality of subscriber communication lines; and
means for connecting the message service system to the switching system such that said switching system also selectively provides communication connections between the message service system and the subscriber communication lines, wherein:
said switching system comprises programmed control means for responding to a call initiated by dialing a directory number assigned to one of the subscriber communication lines by determining if forwarding of the call is necessary;
said programmed control means also determines if the one subscriber communication line has been assigned a plurality of directory numbers;
said programmed control means also determines which of the following options a subscriber associated with the one subscriber communication line has selected:
(1) transmitting the dialed directory number for each call forwarded to the message service system, and
(2) transmitting a predetermined one of the plurality of directory numbers assigned to the one subscriber communication line for all calls forwarded to the message service system;
said switching system further comprises means for forwarding the call to the message service system, and means for transmitting either the dialed directory number or the predetermined one of the plurality of directory numbers assigned to the one subscriber communication line to the message service system based on whether the subscriber associated with the one line has selected option (1) or option (2); and
said message service system comprises means for storing an incoming message in an appropriate one of the mailboxes in response to the number transmitted to the message service system.

23. A communication system as in claim 22, wherein the means for storing data messages comprises means for storing facsimile messages.

24. A communication system comprising:
a plurality of subscriber communication lines;
a message service system for storing incoming messages in a plurality of mailboxes;
a switching system providing selective communication connections between said plurality of subscriber communication lines; and
means for connecting the message service system to the switching system such that said switching system also selectively provides communication connections between the message service system and the subscriber communication lines, wherein:
said switching system comprises programmed control means for responding to a call initiated by dialing a directory number assigned to one of the subscriber communication lines by determining if forwarding of the call is necessary;
said programmed control means also determines if the one subscriber communication line has been assigned a plurality of directory numbers;
said programmed control means also determines which of the following options a subscriber associated with the one subscriber communication line has selected:
(1) transmitting the dialed directory number for each call forwarded to the message service system, and
(2) transmitting a predetermined one of the plurality of directory numbers assigned to the one subscriber communication line for all calls forwarded to the message service system;
said switching system further comprises means for forwarding the call to the message service system, and means for transmitting either the dialed directory number or the predetermined one of the plurality of directory numbers assigned to the one subscriber communication line to the message service system based on whether the subscriber associated with the one line has selected option (1) or option (2); and
said message service system comprises means for storing an incoming message in an appropriate one of the mailboxes in response to the number transmitted to the message service system, wherein the means for storing an incoming message in an appropriate one of the mailboxes comprises:
means for storing the message received during the forwarded call in either a means for storing audible messages or a means for storing data messages based on which one of the plurality of directory numbers assigned to the one subscriber line the message service system actually receives, if the subscriber associated with the one line has selected forwarding of the dialed directory number to the message service system.

25. A communication system as in claim 24, wherein the means for storing data messages comprises means for storing facsimile messages.

26. A communication system comprising:
a plurality of subscriber communication lines;
a message service system for storing incoming messages in a plurality of mailboxes;
a switching system providing selective communication connections between said plurality of subscriber communication lines; and
means for connecting the message service system to the switching system such that said switching system also selectively provides communication connections between the message service system and the subscriber communication lines, the means for connecting the message service system to the switching system comprising a multi-line hunt group, wherein:

said switching system comprises programmed control means for responding to a call initiated by dialing a directory number assigned to one of the subscriber communication lines by determining if forwarding of the call is necessary;

said programmed control means also determines if the one subscriber communication line has been assigned a plurality of directory numbers;

said programmed control means also determines which of the following options a subscriber associated with the one subscriber communication line has selected:

(1) transmitting the dialed directory number for each call forwarded to the message service system, and (2) transmitting a predetermined one of the plurality of directory numbers assigned to the one subscriber communication line for all calls forwarded to the message service system;

said switching system further comprises means for forwarding the call to the message service system, and means for transmitting either the dialed directory number or the predetermined one of the plurality of directory numbers assigned to the one subscriber communication line to the message service system based on whether the subscriber associated with the one line has selected option (1) or option (2); and said message service system comprises means for storing an incoming message in an appropriate one of the mailboxes in response to the number transmitted to the message service system.

27. A communication system as in claim 26, wherein the means for connecting the message service system to the switching system further comprises a data communication link for carrying the number transmitted from the switching system to the message service system.

28. A communication system as in claim 27, wherein the data communication link comprises a simplified message desk interface (SMDI).

29. A communication system comprising:

a plurality of subscriber communication lines;

a message service system for storing incoming messages in a plurality of mailboxes;

a switching system providing selective communication connections between said plurality of subscriber communication lines; and means for connecting the message service system to the switching system such that said switching system also selectively provides communication connections between the message service system and the subscriber communication lines, wherein:

said switching system comprises programmed control means for responding to a call initiated by dialing a directory number assigned to one of the subscriber communication lines by determining if forwarding of the call is necessary;

said programmed control means also determines if the one subscriber communication line has been assigned a plurality of directory numbers;

said programmed control means also determines which of the following options a subscriber associated with the one subscriber communication line has selected:

(1) transmitting the dialed directory number for each call forwarded to the message service system, and (2) transmitting a predetermined one of the plurality of directory numbers assigned to the one subscriber communication line for all calls forwarded to the message service system;

the programmed control means comprises: means for storing data, set at the subscriber's option, to indicate whether the subscriber selected option (1) or option (2); and means to access the stored data during call processing to determine which of the options the subscriber associated with the one subscriber communication line has selected;

said switching system further comprises means for forwarding the call to the message service system, and means for transmitting either the dialed directory number or the predetermined one of the plurality of directory numbers assigned to the one subscriber communication line to the message service system based on whether the subscriber associated with the one line has selected option (1) or option (2); and said message service system comprises means for storing an incoming message in an appropriate one of the mailboxes in response to the number transmitted to the message service system.

30. A communication system as in claim 29, wherein the means for storing data comprises means for storing a translation table of data relating to services provided to a particular subscriber's communication line and one item of information stored in the translation table is the subscriber's selected option as to whether to always transmit the predetermined number or to always transmit the dialed directory number.

31. A communication system as in claim 30, wherein another item of information stored in the translation table is whether a call forwarding service is provided to the particular subscriber's communication line.

32. A communication system comprising:

a plurality of subscriber communication lines;

a message service system for storing incoming messages in a plurality of mailboxes;

a switching system providing selective communication connections between said plurality of subscriber communication lines; and means for connecting the message service system to the switching system such that said switching system selectively provides communication connections between the message service system and the subscriber communication lines, wherein:

said switching system comprises programmed control means for responding to a call initiated by dialing a directory number assigned to one of the subscriber communication lines by determining if forwarding of the call is necessary;

said programmed control means also determines if the one subscriber communication line has been assigned a plurality of directory numbers;

said programmed control means also determines which of the following options a subscriber associated with the one subscriber communication line has selected:

(1) transmitting the dialed directory number for each call forwarded to the message service system, (2) transmitting a predetermined one of the plurality of directory numbers assigned to the one subscriber communication line for all calls forwarded to the message service system, and (3) transmitting one of the directory numbers assigned to the one subscriber communication line to the message service system unless the dialed directory number corresponds to a preselected one of the plurality of directory numbers assigned to the one subscriber communication line;

said switching system further comprises means for forwarding the call to the message service system, and means for transmitting either the dialed directory number or the predetermined one of the plurality of directory numbers assigned to the one subscriber communication line to the message service system based on whether the subscriber associated with the one line has selected option (1) or option (2);

said message service system comprises means for routing an incoming message to an appropriate one of the mailboxes in response to the number transmitted to the message service system;

wherein said programmed control means selectively controls one of the means for forwarding and the means for transmitting such that (a) if the subscriber associated with the one line has selected option (3) and the dialed directory number does not correspond to said preselected one of the plurality of directory numbers assigned to the one subscriber line, the call is forwarded to the message service system, and a directory number assigned to the one subscriber communication line is transmitted to the message service system; and (b) if the subscriber associated with the one line has selected option (3) and the dialed directory number corresponds to said preselected one of the plurality of directory numbers assigned to the one subscriber communication line, effective forwarding of the call to the message service system is prevented.

33. A communication system as in claim 32, wherein if the subscriber associated with the one line has selected option (3) and the dialed directory number corresponds to said preselected one of the plurality of directory numbers assigned to the one subscriber communication line, said programmed control means controls the means for transmitting to prevent transmission of any of the directory numbers assigned to the one line to the message service system.

34. A communication system as in claim 32, wherein if the subscriber associated with the one line has selected option (3) and the dialed directory number corresponds to said preselected one of the plurality of directory numbers assigned to the one subscriber communication line, said programmed control means controls the means for forwarding to block forwarding of the call to the message service system.

35. A communication system as in claim 32, wherein if the subscriber associated with the one line has selected option (3) and the dialed directory number does not correspond to said preselected one of the plurality of directory numbers assigned to the one subscriber communication line, the programmed control means control the transmitting means to transmit the dialed directory number to the message service system.

36. A communication system in claim 32, wherein if the subscriber associated with the one line has selected option (3) and the dialed directory number does not correspond to said preselected one of the plurality of directory numbers assigned to the one subscriber communication line, the programmed control means control the transmitting means to transmit a pre-specified one of the directory numbers assigned to the one line to the message service system.

37. A communication system comprising:
a plurality of subscriber communication lines;
a message service system for processing incoming messages;
a network providing selective communication connections between said plurality of subscriber communication lines and selectively providing communication connections between the message service system and the subscriber communication lines; and
a programmed controller within said network for detecting a call for one of the subscriber lines which has been assigned a plurality of directory numbers and controlling the network to forward said call to the message service system, said call being initiated by input of one of the directory numbers, wherein:
if a subscriber associated with the one line has previously selected to have actual input directory numbers transmitted to the message service system for calls forwarded to the message service system, the network transmits said input one of the directory numbers to the message service system; and
if the subscriber has previously selected to have a predetermined one of the plurality of directory numbers assigned to the one line transmitted to the message system for all calls forwarded to the message service system, transmitting the predetermined directory number to the message service system.

38. A communication system as in claim 37, wherein said message service system comprises means for processing an incoming message in a manner selected in response to a number transmitted to the message service system.

39. In a communication system selectively routing calls to a plurality of subscriber links and to at least one message service system, a method comprising the steps of:
detecting a call for one of the subscriber links which has been assigned a plurality of directory numbers, wherein said call is initiated by input of one of the directory numbers;
forwarding said call to the message service system;
if a subscriber associated with the one link has previously selected to have actual input directory numbers transmitted to the message service system for calls forwarded to the message service system, transmitting said input one of the directory numbers to the message service system; and
if the subscriber has previously selected to have a predetermined one of the plurality of directory numbers assigned to the one link transmitted to the message system for all calls forwarded to the message service system, transmitting the predetermined directory number to the message service system.

40. A method as in claim 39, wherein said subscriber links comprise lines.

41. A method as in claim 39, further comprising:
using the input one of the directory numbers to control operation of the message service system if said input one of the directory numbers is transmitted to the message service system; and using the predetermined one of the directory numbers to control operation of the message service system if said predetermined one of the directory numbers is transmitted to the message service system.

42. A communication system comprising:

a plurality of subscriber communication means, each for providing a subscriber communication access to the system;

a message service system for processing incoming messages;

a network providing selective communications between said plurality of subscriber communication means and selectively providing communications between the message service system and the subscriber communication means; and a programmed controller within said network for detecting a call for one of the subscriber communication means which has been assigned a plurality of directory numbers and controlling the network to forward said call to the message service system, said call being initiated by input of one of the directory numbers through another of the subscriber communication means, wherein:

if a subscriber associated with said one subscriber communication means has previously selected to have actual input directory numbers transmitted to the message service system for calls forwarded to the message service system, the network transmits said input one of the directory numbers to the message service system; and if the subscriber associated with said one subscriber communication means has previously selected to have a predetermined one of the plurality of directory numbers assigned to the one subscriber communication means transmitted to the message system for all calls forwarded to the message service system, transmitting the predetermined directory number to the message service system.

* * * * *